(12) United States Patent
Enbom et al.

(10) Patent No.: US 8,491,703 B2
(45) Date of Patent: Jul. 23, 2013

(54) SUPPLY AIR DEVICE AND METHOD FOR PURIFICATION OF AIR IN A SUPPLY AIR DEVICE

(75) Inventors: Seppo Enbom, Kangasala (FI); Matti Lehtimäki, Lempäälä (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 716 days.

(21) Appl. No.: 12/594,674

(22) PCT Filed: Apr. 2, 2008

(86) PCT No.: PCT/FI2008/050160
§ 371 (c)(1),
(2), (4) Date: May 24, 2010

(87) PCT Pub. No.: WO2008/119893
PCT Pub. Date: Oct. 9, 2008

(65) Prior Publication Data
US 2010/0242726 A1    Sep. 30, 2010

(30) Foreign Application Priority Data

Apr. 3, 2007 (FI) ...................................... 20075226

(51) Int. Cl.
*B03C 3/011* (2006.01)
(52) U.S. Cl.
USPC ............... 95/58; 95/60; 95/73; 95/78; 96/52; 96/63; 96/74

(58) Field of Classification Search
USPC .................. 95/58, 60, 67, 73, 78; 96/52, 55, 96/60, 62, 63, 74; 55/DIG. 39
See application file for complete search history.

(56) References Cited

U.S. PATENT DOCUMENTS

| | | | | |
|---|---|---|---|---|
| 3,411,025 A | * | 11/1968 | Marks | 310/11 |
| 4,181,253 A | | 1/1980 | Barlow | |
| 4,248,162 A | * | 2/1981 | Skeist | 108/50.13 |
| 4,339,782 A | * | 7/1982 | Yu et al. | 96/62 |
| 4,344,776 A | * | 8/1982 | Yavnieli | 96/63 |
| 5,092,396 A | | 3/1992 | Murano et al. | |
| 5,865,880 A | * | 2/1999 | Matsui | 96/26 |
| 5,961,693 A | * | 10/1999 | Altman et al. | 95/78 |

(Continued)

FOREIGN PATENT DOCUMENTS

| | | |
|---|---|---|
| DE | 3321612 A1 | 12/1984 |
| EP | 0475493 A2 | 3/1992 |

(Continued)

OTHER PUBLICATIONS

PCT/ISA/210—International Search Report—Jun. 17, 2008.

(Continued)

*Primary Examiner* — Richard L Chiesa
(74) *Attorney, Agent, or Firm* — Venable LLP; Eric J. Franklin

(57) ABSTRACT

A supply air device including supply air nozzles, through which incoming air is led into a mixing chamber and further into a room so that the supply air device induces a secondary air flow from the room. An electric particle filter and/or a cell gas filter, through which the circulating or secondary air flow is led.

18 Claims, 1 Drawing Sheet

U.S. PATENT DOCUMENTS

| | | | |
|---|---|---|---|
| 6,156,088 A * | 12/2000 | Cardarelli | 55/385.8 |
| 6,185,934 B1 * | 2/2001 | Teboul | 60/297 |
| 6,224,652 B1 * | 5/2001 | Caperan et al. | 95/29 |
| 6,379,437 B1 | 4/2002 | Heinonen et al. | |
| 6,905,029 B2 * | 6/2005 | Flagan | 209/210 |
| 6,989,050 B2 * | 1/2006 | Ganeev et al. | 96/63 |
| 7,311,756 B2 * | 12/2007 | Ashworth | 95/70 |
| 2003/0029319 A1 * | 2/2003 | Ninomiya et al. | 96/63 |
| 2003/0110943 A1 * | 6/2003 | Page et al. | 95/62 |
| 2007/0234901 A1 * | 10/2007 | Pletcher et al. | 95/78 |

FOREIGN PATENT DOCUMENTS

| | | | |
|---|---|---|---|
| EP | 1021239 B1 | 7/2000 | |
| EP | 1125622 A2 | 8/2001 | |
| JP | 60-129114 A * | 7/1985 | 96/90 |
| JP | 2-259338 A | 10/1990 | |
| JP | 7-185390 A | 7/1995 | |
| JP | 9-79598 A | 3/1997 | |
| JP | 2000-218112 A | 8/2000 | |
| JP | 2007-021411 A | 2/2007 | |
| WO | WO-95/30862 A1 | 11/1995 | |
| WO | WO-99/15259 | 4/1999 | |

OTHER PUBLICATIONS

PCT/IPEA/409—International Preliminary Report on Patentability—Sep. 28, 2009.

PCT/ISA/237—Written Opinion of the International Searching Authority—May 26, 2008.

R. Holopainen et al; Exposure to Fine Particles Indoors—How to Control?; Closing Seminar of FINE Technology Program; Mar. 13-14, 2006; 4 pages (including English translation).

* cited by examiner

SUPPLY AIR DEVICE AND METHOD FOR PURIFICATION OF AIR IN A SUPPLY AIR DEVICE

CROSS-REFERENCE TO RELATED APPLICATIONS

This application claims priority to Finnish patent application 20075226 filed Apr. 3, 2007 and is the national phase under 35 U.S.C. §371 of PCT/FI2008/050160 filed Apr. 2, 2008.

FIELD OF THE INVENTION

The invention relates to a supply air device, through which an air flow is led into a room in such a way that the supply air flow induces a circulating i.e. secondary air flow from the room to flow through a filter and/or a heat exchanger and further to return to the room. Furthermore, the invention relates to a method for removing airborne impurities in said device.

BACKGROUND OF THE INVENTION

For the cooling of rooms, it has become common to provide the ceilings of the rooms with supply air devices, wherein incoming or primary air supplied from a central ventilation system is blown from nozzles inside the device at a relatively high rate to a mixing element inside the supply air device, where a circulating i.e. secondary air flow from the room is induced into the supply air jets. The air mixture formed by the primary and secondary air is led from the supply air device into the room. The secondary air induced from the room enters the supply air device via a heat exchanger which enables the cooling or, alternatively, the heating of the air. The provision of such supply air devices has resulted in a significant improvement in the control of internal thermal conditions. However, there has not been any corresponding development in the removal of impurities from indoor air.

In view of the purity of indoor air, for example, construction materials with a minimum of emissions and impurity-freer components of air-conditioning systems have been developed, and investments have been made on e.g. the regular cleaning of central air-conditioning systems and more efficient filtering of air. To improve the control of impurities in indoor air, another significant measure for the air-conditioning is to increase the outdoor air flow.

The significance of increasing the outdoor air flow rate is relatively limited in view of the quality of indoor air. For example, doubling the air flow rate will reduce the content of impurities from indoor sources in indoor air into a half. However, increasing the outdoor air flow rate will increase the need for cooling and heating and thereby contradict the aim of limiting energy consumption in buildings. Increasing the supply air flow rates will involve an increase in the size of the conditioned air ducts, which will result in an increase in the height of floors in buildings, thereby increasing the costs.

A filtering arrangement in the supply air device itself is presented, for example, in DE 3321612. The document discloses a supply air device, in which a secondary air flow is led through a filter before a heat exchanger. The filter used is a conventional filter mat which, however, causes a high flow resistance, which is not advantageous for the function of the supply air device. The high flow resistance reduces the secondary air flow too much, wherein the filtering of the secondary air flow does not have a significant effect on the quality of indoor air. If the supply air device is equipped with cooling or heating, the flow resistance of the filter mat restricts the air flow through said elements too much, resulting in an excessive reduction in the cooling/heating efficiency of the supply air device. If the filter used is a fabric filter that is very permeable to air, the secondary air flow may be at an acceptable level, but the efficiency of purification with the filter will remain low.

SUMMARY OF THE INVENTION

It is an aim of the present invention to present a supply air device for reducing the content of impurities in indoor air without increasing, among other things, the energy consumption and the air flows of the central air conditioning system. It is another aim of the invention to present a supply air device in which the flow resistance induced by the filter is low, and consequently, the filter does not disturb the function of the supply air device.

To achieve this aim, the supply air device according to the invention is characterized in that in the supply air device, the secondary air flow is led through a filter comprising an electric particle filter or cell gas filter, or the supply air device comprises both of said filters.

The supply air device according to the invention is based on the idea that the filter used for filtering the secondary air flow causes a pressure loss as low as possible, wherein the arrangement according to the invention does not restrict the secondary air flow and thereby disturb the purification and cooling or heating of air, if the supply air device is also equipped with a heat exchanger. In the supply air device according to the invention, an embodiment is used for particulate impurities, whose function in the separation of fine particles is primarily based on an electric filtering effect. For gaseous impurities, a cellular filter is used, which causes a low pressure loss compared with conventionally operated filter arrangements, whose tight structure causes a high pressure loss.

The filter used in the supply air device according to the invention causes a pressure loss of not more than 5 Pa which will not reduce the secondary air flow too much and does not, on the other hand, cause flow noise to a disturbing extent.

The pressure loss induced by the filter refers to the pressure difference over the filter.

By the arrangement according to the invention, it is possible to control both the impurities and the thermal conditions of indoor air, if the device also comprises a heat exchanger. The aim of the supply air device according to the invention is to purify indoor air from impurities which are entrained in primary air or leaking outdoor air or are caused, for example, by people and their activities or equipment in the room.

In the supply air device according to the invention, an electric filter, which may be, for example, an electric filter cell, is used for filtering small airborne particles from a secondary air flow. In view of the electric particle filter, it is advantageous that the air flow entering the filter is ionized so that the particles in the air flow are electrically charged and can thus be removed from the air flow by means of the electric filter. The supply air device according to the invention is advantageously equipped with an ionizer, but the ionizer may also be placed outside the device. The ionizer may also refer to a device installed on the front side of the filter or a device which is integrated in the filter and in which particles are charged by ions produced by corona discharge. The supply air device according to the invention may also comprise a cell gas filter in addition to the above-mentioned electric particle filter, or alternatively, the cell gas filter may be the only filter used for the purification of the secondary air flow. The cell gas filter is used for removing gaseous impurities from the air.

With the above-mentioned electric particle filters, fine particles having a diameter of 0.1 μm can be removed from the secondary air flow at a collection efficiency of more than 80%.

The cross-sectional area of the filter covers advantageously the whole secondary air flow, but with respect to the secondary air flow, the cross-sectional area of the filter does not necessarily need to cover the whole secondary air flow but a part of the secondary air can be circulated past the filtering element.

With the filter arrangement of the supply air device according to the invention, a low pressure loss is achieved in combination with a high capacity of separating airborne impurities. The purification effect produced by the filtering of secondary air according to the invention (effective air flow or production of completely pure air) is multiple compared with the effect of purifying merely the primarily air flow. Due to the low pressure loss of the filter arrangement, the filtering does not increase the noise generated by the supply air device. The energy consumption and power required by the filtering is also very low. The arrangement according to the invention can thus be used to improve the quality of indoor air at low energy costs.

The supply air device according to the invention is advantageously a chilled beam or a so-called cooling beam to be installed in the ceiling, the supply or primary air entering the beam from the outside of the device, normally from a central ventilation system.

Furthermore, it is an aim of the invention to present a method for removing airborne impurities in a supply air device. The method according to the invention is primarily characterized in that the circulating i.e. secondary air flow is filtered by means of an electric particle filter and/or a cell gas filter.

BRIEF DESCRIPTION OF THE DRAWINGS

In the following, the invention will be described in more detail with reference to the appended drawings, in which.

DETAILED DESCRIPTION OF EMBODIMENTS OF THE INVENTION

Figure 1:
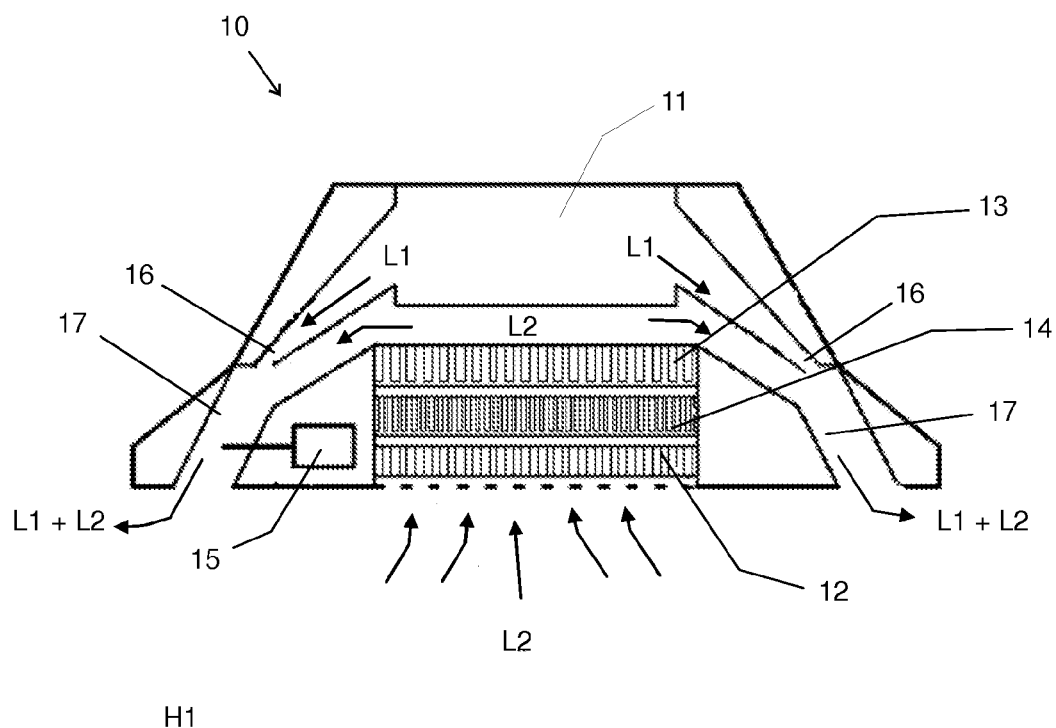
FIG. 1 shows the principle of operation of the supply air device according to the invention in a cross-sectional view.

FIG. 1 shows an example of a supply air device 10 which is a chilled beam to be installed in a ceiling, supply air entering the beam from the outside of the device. The supply or primary air L1 is led via a supply air duct (not shown in the figure) to a supply air chamber 11, from which the supply air L1 is led further via air nozzles 16 into an induction chamber 17. The primary air flow blown into the induction chamber induces a circulating i.e. secondary air flow L2 from a room H1 into the induction chamber where the air flows L1 and L2 are mixed. From the induction chamber, the mixture of the air flows L1 and L2 is discharged into the room H1. The circulating i.e. secondary air flow L2 induced by the supply air flow L1 from the room H1 passes via a filter or filters 12, 14 and a heat exchanger 13 into the induction chamber 17. If the supply air device is used solely for the purification of air, it does not comprise the heat exchanger 13.

The supply or primary air L1 is blown into the induction chamber 17 via nozzles 16 inside the supply air device 10 at a relatively high rate, wherein the secondary air flow L2 induced into the air jets is about five times the primary air flow L1.

The supply air device 10 may be an electric particle filter 12 or a cell gas filter 14, or the supply air device may comprise both of the above-mentioned filters 12 and 14. The fine particles in the circulating i.e. secondary air flow L2 can be removed by means of the electric particle filter 12. The gaseous impurities can be removed by means of the cell gas filter 14.

The air supplied into the electric particle filter is ionized, wherein the particles entrained in the air flow are electrically charged. The charged particles are led into the filter, in which the separation of the particles from the air flow is effected primarily by electric forces so that the filter comprises an electric field that collects charged particles. The electric particle filter used in the supply air device thus comprises two stages; in other words, the charging of the particles takes place in a different location than the filtering of the charged particles from the air flow. The filter element may be disposable, wherein it must be replaced after a certain time of use. The filter element may also be cleanable, wherein the particle mass collected in the filter is removed by washing or vacuuming.

Figure 2:
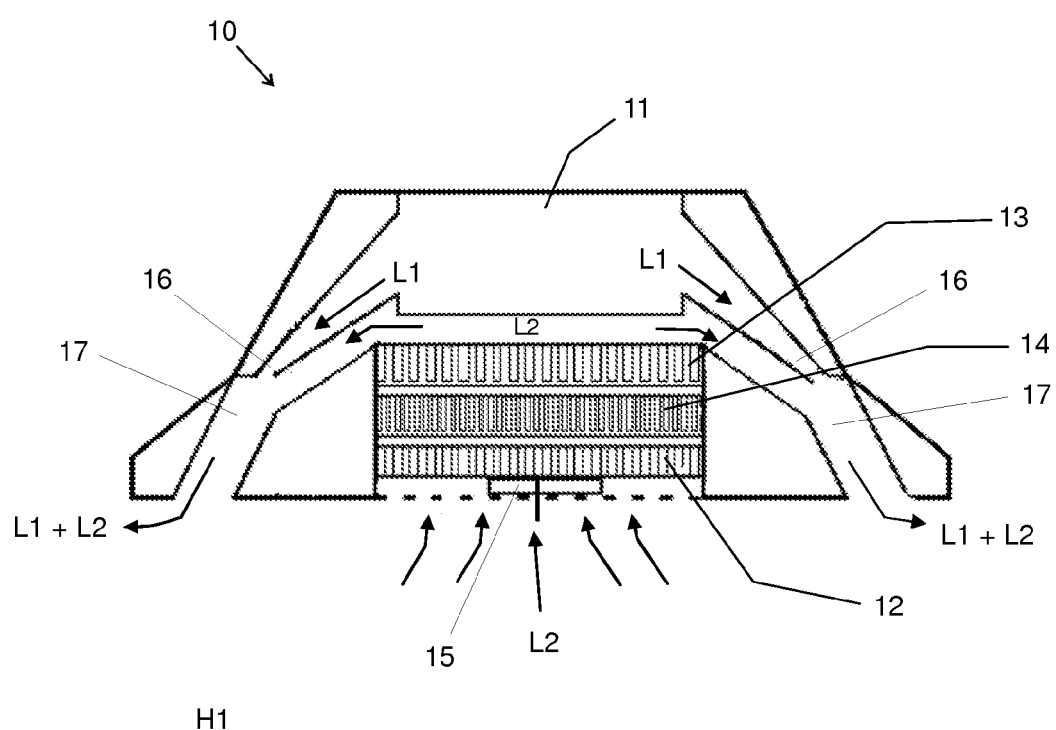
FIG. 2 shows the principle of operation of the supply air device according to another embodiment of the invention in a cross-sectional view.

The supply air device is advantageously equipped with an ionizer 15, but the ionizer may also be placed outside the device. As shown in FIG. 2, the ionizer 15 is advantageously placed on the front side of the filter, wherein the fine particles in the secondary air flow are charged right before entering the filter. Alternatively, the ionizer 15 can also be placed in the combined flow L1+L2, as shown in FIG. 1. The ionizer may also refer to a device installed on the front side of the filter or a device which is integrated in the filter and in which particles are charged by ions produced by corona discharge.

The electric particle filter may be 1) an electric filter cell, 2) an electric fabric filter, or 3) a fabric filter made of electret material. In all the filter types, the removal of particulate impurities from the air flow is primarily based on the opposite electric charge of the particles and the filter. If a particle filter made of electret material is used in the supply air device, the ionizer will not be necessary, but the ionizer may be used to boost the filtering. With the electric particle filter, also fine particles having a diameter of 0.1 μm can be removed from the air flow at a collection efficiency of more than 80%.

The cell gas filter is used for removing gaseous impurities from the air flow. The cell gas filter used in the supply air device has preferably the structure presented in European patent publication EP 1021239.

The electric particle filter and/or the cell gas filter in the supply air device are advantageously placed upstream of the heat exchanger in the secondary air flow. The filters have a thickness of about 20 to 30 mm, and the secondary air flow rate through the filter is about 0.1 to 0.25 m/s.

In supply air devices presently in use, a cooling radiator and the grate in front of it cause a total pressure loss of about 0.6 to 1 Pa. Supplementing the structure with an electric filter will increase the pressure loss by less than 0.5 Pa. In the arrangement according to the invention, the pressure loss caused by the filter or filters is preferably less than 1 Pa, wherein the filtration of the air flow will not disturb the operation of the supply air device.

In the supply air arrangements shown in FIGS. 1 and 2, the overpressure of the supply air chamber 11 with respect to the room H1 is typically about 60 to 100 Pa. So that the air flow L1 blown by said overpressure via the nozzles 16 can induce in itself a sufficient secondary air flow L2 in the induction chamber 17, the pressure loss by the filters in the secondary air flow should not exceed 5 Pa. It is possible to achieve this targeted pressure loss, when an electric particle filter and/or a cell gas filter are used for filtering the air.

The supply air device according to the invention was subjected to tests to find out the air flow rate of the secondary air flow in a chilled beam equipped with an electric filtering cell and to evaluate the achievable effective air flow rate (particle-free air flow rate) in the chilled beam on the basis of said result per meter of beam length. The measurements were taken for a chilled beam whose structure was not optimized in view of filtering technology.

According to the measurements taken, the secondary air flow rate in the chilled beam equipped with a filter element was 25 dm$^3$/s per meter of beam length. The air flow rate through the filtering element was 0.15 m/s. In central ventilation machines, the air flow rate through electric filters is typically 2.5 m/s, and the collecting efficiency of electric filters is about 90%. At the air flow rate of 0.15 m/s, the collecting efficiency of electric filters is close to 100%. When the filtering technique is also taken into account in the structure of the chilled beam, it is reasonable to deduce that the effective rate of the air flow purified in the filtering element of the chilled beam equipped with particle filtering may be at least 30 dm$^3$/s per meter of length of the chilled beam. By equipping the chilled beams with electric filters, it is possible to reduce the particle content of indoor air in the use of the chilled beam to one third.

The invention also relates to a method for removing airborne impurities in a supply air device, in which method a circulating i.e. secondary air flow is filtered by an electric particle filter and/or a cell gas filter, as described above.

The secondary air flow can be led in whole or in part through the filter. Advantageously, the cross-sectional area of the filter covers the whole secondary air flow. In a corresponding manner, the secondary air flow can be cooled or heated in whole, or only a part of the air flow is passed through a heat exchanger. Alternatively, the supply air device may be equipped with a heat exchanger bypass plate, wherein the need of heating/cooling can be adjusted according to the load. The need for cooling or heating the air flow varies, and the adjustment is normally made by changing the stream flow in the heat exchanger. The supply air device can also be used solely for the purification of air, wherein the device comprises no heat exchanger.

The supply air device according to the invention is advantageously an active chilled beam, the primary air entering the beam from the outside of the device, normally from a central ventilation system. In these devices, the primary air coming from a central ventilation system is blown from nozzles inside the device into the room so that a secondary air flow is induced from the room and led into the chilled beam via a cooling cell. In the supply air device according to the invention, the secondary air flow is filtered before the cooling cell by means of an electric particle filter and/or a cell gas filter, which cause a flow resistance so low that it does not disturb the cooling of the air flow.

However, the filtering arrangement according to the invention can also be utilized in so-called blower coil terminal equipment. The arrangement according to the invention can also be utilized solely for the purpose of air purification; in other words, any incoming air flow can be supplied with a supply air device comprising filtration of secondary air.

The supply air device according to the invention can be applied, inter alia, in uses where a sufficiently good quality of indoor air is not achieved by the purification of incoming air, for example because of a low supply air flow rate, a high content of impurities in atmospheric air, or a high content of impurities caused by indoor sources.

The invention claimed is:

1. A supply air device, comprising:
   supply air nozzles;
   a mixing chamber, to which supply air flow is led through the supply air nozzles and in which the supply air flow and a secondary air flow induced by the supply air flow are mixed to a combined air flow;
   a discharge configured to discharge said combined air flow from said mixing chamber into a room; and
   at least one filter through which the secondary air flow from the room is led into the mixing chamber,
   wherein said at least one filter comprises an electric particle filter, the supply air device comprising an ionizer, which charges airborne impurity particles of the air flow utilizing ions produced by corona discharge, said ionizer being placed on the combined air flow or in the secondary air flow before the at least one filter.

2. The supply air device according to claim 1, further comprising:
   a cell gas filter.

3. The supply air device according to claim 1, wherein the electric particle filter comprises an electric filter cell.

4. The supply air device according to claim 1, wherein the electric particle filter comprises an electric fabric filter.

5. The supply air device according to claim 1, wherein the electric particle filter comprises a fabric filter made of electret material.

6. The supply air device according to claim 1, wherein a separating capacity of the particle filter is greater than 80% for particles of 0.1 μm.

7. The supply air device according to claim 1, wherein a pressure loss caused by the at least one filter is not more than 5 Pa.

8. The supply air device according to claim 7, wherein the pressure loss caused by the at least one filter is less than 1 Pa.

9. The supply air device according to claim 1, wherein the cross-sectional area of the at least one filter with respect to the secondary air flow covers the whole secondary air flow.

10. The supply air device according to claim 1, further comprising:
    a heat exchanger, through which the circulating or secondary air flow is led.

11. The supply air device according to claim 1, wherein the supply air device is a chilled beam to be installed in the ceiling.

12. A method for removing airborne impurity particles in a supply air device, comprising:
    causing supply air flow to enter the supply air device;
    inducing a secondary air flow from a room by means of the supply air flow;
    causing said secondary air flow to pass from the room through at least one electric particle filter in the supply air device;
    filtering said secondary air flow with the at least one electric particle filter;
    combining the supply air flow and said secondary air flow passed through said filter to a combined air flow in the supply air device and leading said combined air flow further into the room; and
    charging the airborne impurity particles with ions produced by corona discharge either in the combined air flow or in the secondary air flow before the at least one electric particle filter.

13. The method according to claim 12, wherein the secondary air flow is filtered additionally by a cell gas filter.

14. The method according to claim 12, wherein the at least one electric particle filter removes particles having a diameter of 0.1 μm from the secondary air flow at a collection efficiency greater than 80%.

15. The method according to claim 12, wherein a pressure loss caused by the at least one electric particle filter is not greater than 5 Pa.

16. The method according to claim 12, wherein the secondary air flow is led in whole through the at least one electric particle filter.

17. The method according to claim 12, wherein the secondary air flow rate through the at least one electric particle filter is 0.1 to 0.25 m/s.

18. The method according to claim 12, wherein the secondary air flow is cooled or heated.

* * * * *

UNITED STATES PATENT AND TRADEMARK OFFICE
CERTIFICATE OF CORRECTION

| | | |
|---|---|---|
| PATENT NO. | : 8,491,703 B2 | Page 1 of 1 |
| APPLICATION NO. | : 12/594674 | |
| DATED | : July 23, 2013 | |
| INVENTOR(S) | : Enbom et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 949 days.

Signed and Sealed this
Eleventh Day of March, 2014

Michelle K. Lee
*Deputy Director of the United States Patent and Trademark Office*